United States Patent [19]

Mishra

[11] Patent Number: 4,552,736
[45] Date of Patent: Nov. 12, 1985

[54] POTASSIUM FLUORIDE STABILIZED AMMONIUM NITRATE

[75] Inventor: Indu B. Mishra, Carbondale, Ill.

[73] Assignee: Olin Corporation, Stamford, Conn.

[21] Appl. No.: 490,633

[22] Filed: May 2, 1983

[51] Int. Cl.$^4$ ................................................ C05C 1/02
[52] U.S. Cl. ..................................... 423/266; 423/396
[58] Field of Search ................................ 423/266, 396

[56] References Cited

U.S. PATENT DOCUMENTS

| | | | |
|---|---|---|---|
| 2,590,054 | 3/1952 | Taylor et al. | 423/396 |
| 2,657,977 | 11/1953 | Stengel et al. | 423/396 |
| 2,943,928 | 7/1960 | Guth | 423/396 |
| 3,212,944 | 10/1965 | Lyon et al. | 423/396 |
| 3,428,418 | 2/1969 | McFarlin et al. | 423/396 |
| 4,001,377 | 1/1977 | Hahn et al. | 423/396 |

OTHER PUBLICATIONS

Chemical Abstracts 85:179814y.
Chemical Abstracts 82:113602j.
Chemical Abstracts 81:123687j.
Chemical Abstracts 93:248453j.

*Primary Examiner*—John Doll
*Assistant Examiner*—Wayne A. Langel
*Attorney, Agent, or Firm*—Bruce E. Burdick

[57] ABSTRACT

The undesirable abrupt expansion and contraction of ammonium nitrate in the temperature range of use of a rocket motor and explosives (−55° C. to 80° C.) is eliminated by the addition of 0.5 to 2% by weight of a crystal growth inhibitor, specifically potassium fluoride (KF).

3 Claims, No Drawings

POTASSIUM FLUORIDE STABILIZED AMMONIUM NITRATE

BACKGROUND AND SUMMARY OF INVENTION

This invention relates to ammonium nitrate and more particularly to crystalline growth inhibitor for ammonium nitrate.

Ammonium nitrate (AN) is used in solid propellant, gas generators and explosives. A well recognized inherent property of ammonium nitrate is its dimensional instability when heated or cooled. When heated, AN experiences a ~3% volumetric contraction at −18 to 0° C. and a ~3.5% expansion in volume at 32° to 50° C. Upon cooling, the reverse occurs but at different temperatures with a resultant net volume charge after thermal cycling. This expansion or contraction occurs in the temperature range of use of rocket motors or explosives. There have been catastrophic failures of rocket motors, as a result of excessive pressure caused by cracks and excess burn surface resulting from the undesirable expansion and contraction. A solution to this problem is badly needed.

The current solution to this dimensional instability problem is addition of 10 to 17% by weight of potassium nitrate to the AN. However, this approach results in a large amount of residue in the combustion products, and thus tends to corrode and plug the rocket nozzle. Furthermore, this added potassium nitrate lowers the weight percent of AN in the propellant and reduces the performance of the solid propellants and explosives in which it is used. For the above mentioned reasons, this approach is not satisfactory.

The present invention provides a solution to the above problem. By the addition of only 0.5 to 2% by weight of a specific crystal growth inhibitor, we have eliminated the undesirable abrupt expansion and contraction of ammonium nitrate in the temperature range of use of a rocket motor and explosives (−55° C. to 80° C.). Specifically, we have found that potassium fluoride (KF) added to $NH_4NO_3$ in these small amounts effectively inhibits crystalline growth to the less dense orthothombic phase III of the 5 ammonium nitrate phases described below, and prevents the otherwise normal contraction during the transition from Phase V to Phase IV. The potassium fluoride must be added in the molten phase (I) and the KF modified AN then cooled.

This KF modified AN does not experience the otherwise normal excessive volume growth of up to 25% upon thermal cycling in the −55° to 80° C. temperature range, and yet does not produce excessive residues like $KNO_3$ modified AN.

Thus, the KF significantly alters the normal inherent undesirable characteristics of $NH_4NO_3$ while eliminating the undesirable characteristics of conventional $KNO_3$ additive.

As used below, "DSC" means differential scanning calorimetry and "TMA" means thermo mechanical analysis (length expansion versus temperature).

DETAILED DESCRIPTION

As stated before, AN experiences abrupt specific volume changes during heating or cooling. Table VII below shows the temperature instability of AN. The crystal phase changes of AN during heating and cooling are accompanied by undesirable volume changes since the crystalline phases are of different natures with different specific volume.

Table IX shows the absence of the abrupt volume changes in the phase stabilized AN of the invention, thus indicating effective inhibition of the normal nonlinear volume changes in response to the expected temperature range of use of rocket propellants (−55° to 80° C.). Since it is recognized that the specific temperature at which the normal volume changes occur is dependent upon moisture content, it is preferred to use anhydrous KF as the additive.

As a part of the invention, a review of the historical approaches used to provide or ensure thermal stability of ammonium nitrate was made. I have concluded that stabilization is accomplished by diffusion of compounds that have identical orthorhombic lattices, thus encouraging the AN to stay in the orthorhombic phase longer. I further conclude that phase stabilization is more effective if a solid solution and eutectic are formed and that the substitution of an ammonium cation with a guest cation and reduction of N-H . . . O hydrogen bonding appears to reduce crystal disorder and seems to play a key role in phase stabilization. Although recently suggested as a phase stabilizer for AN, the 5-amino tetrazole forms a solid solution and eutectic with AN phase stabilization of AN is not accomplished. However, I have found that addition of 1-2% anhydrous potassium fluoride results in true phase stabilization. Thermomechanical analysis and hysteresis plots show that the KF modified AN crystals expand linearly from −55° to 80° C.

A. INTRODUCTION

Pure and dry ammonium nitrate (AN) exists in at least five different polymorphic forms at atmospheric pressure. The transition temperatures of the various phases are accepted as:

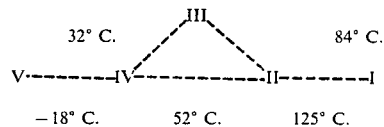

However, considerable hysteresis occurs with many of these transitions. For example, the II to III phase transition occurs anywhere between 46° to 84° C. The III-II phase transition occurs between 84° and 90° C. Furthermore, direct IV-III transitions occur with considerable thermal hysteresis, between 32° and 55° C. and III-IV between −1° to 35° C. It is well known to propellant manufacturers and users that the transition temperatures are dependent on a number of variables including water content, impurity content and thermal history, and are often very difficult to quantify. The interrelationships between these variables have not been thoroughly investigated.

A phase intermediate between phases IV and III has been suggested by Engel et al and shown by Ingman et al. by crossed polarizer microscope. No sharp transition temperature has been reported for this phase intermediate. Therefore, it may be a material where phase IV is in metastable state with more thermodynamically stable III, where simultaneous IV-II transitions coexist.

A common belief in the propellant community is that moisture plays an important role in determining the phase transition in AN. For example, high moisture content usually favors IV-III transitions. However, Ingman et al clearly showed that AN underwent IV-II transitions at 50° C. rather than at 35° C. despite the presence of saturated mother liquor.

AN users in agriculture and defense industries control the phase transition temperatures by adding a small percent by weight of certain foreign materials to AN solution prior to the prilling operation. These materials include clay minerals, potassium nitrate, nickel complexes and copper complexes, magnesium oxide, toluene diisocyanate, tributylphosphate, and a mixture of ammonium sulfate, ammonium phosphate and boric acid. Most of these additives provide a hard, rigid coating which prevents the "caking" that is typical of AN that has been stored for several months.

B. PHASE STABILIZATION OF AN

Phase stabilization is carried out by reaction in the solid state. Solids show two types of properties:

Structure insensitive: properties depend upon the chemical formula, the lattice dimensions, the true density, specific heat, the thermal expansion, and electrical conductivity.

Structure sensitive: properties depend on mode of preparation, pretreatment, particle size and shape, and chemical reactivity.

Reaction in the solid state occurs by diffusion of guest particles or ions within the interior of the host particles. Solid phase diffusion in metal was first observed by Michael Faraday in 1820. Solid phase reactions occur at the phase boundary and proceed inward. They may not easily attain equilibrium under ambient temperature. In order to do so, the heat of reaction must be small and so too, the energy of activation, but more importantly, the difference of entropies must not be zero.

From an experimental standpoint, the diffusion coefficients of the ions can be obtained approximately from the conductivity data, using the Einstein relationship:

$$D = kTB$$

where,
D = Diffusion Coefficient
k = Boltzman Constant
T = Absolute Temperature
B = Mobility of the ion in question.

Direct measurement of the diffusion coefficient can be made in many cases using radioactive isotopes.

C. FORMATION OF SOLID SOLUTIONS

Many pairs of substances with similar crystal structures form a range of solid solutions. There are so many complicating factors that it is hard to predict whether or not two substances would form solid solutions. Compounds with quite different structures and even different formula type form solid solutions: for example, AgBr (NaCl structure) and AgI (Wurzite structure) or $CaF_2$ and $YF_3$. Substances with the same type of crystal structure do not necessarily form solid solutions, as there are other conditions which must be met. These are:

Size Factor—for complete miscibility of structurally similar materials, the radius of the ions cannot differ by over 15%. KCl and KBr are miscible, KCl and KI are not.

Bonds in the two crystals must be similar. KCl forms solid solution with KBr but not with PbS, which has the same crystal structure. The dimensions of the unit cells are very close. KCl does not form a solid solution with PbS because of:
Problems of solubility or miscibility
Decomposition before melting Mixed crystals are grown from a solution or a molten mixture of two salts. In the case of calcium carbonate and sodium nitrate, $CaCO_3$ a = 6.361 Å and alpha = 46.07

$NaNO_3$ a = 6.32 Å and alpha = 47.15, but mixed crystals cannot be made; however, oriented overgrowths are seen. For oriented overgrowths interatomic distances correspond; however, there are many exceptions (Alizarin on PbS, NaCl and Thiourea). In such cases, the overgrowths are anchored to the substrate only along lines or at points.

Thus, one may conclude that formation of solid solutions by two different compounds does not mean that they have the same type of crystal structure.

D. AMMONIUM NITRATE

Ammonium nitrate (AN), $NH_4No_3$, has CsCl-like structure. There are five polymorphic modifications. The two stable ones are cubic. The one occurring between 169° and 125° C., called Phase I, gives a very simple diffraction pattern expected from CsCl grouping of $NH_4$ and $NO_3$ ions in which the atoms do not have fixed positions in the structure, i.e., it is an arrangement with "rotating" nitrate groups. For it, the unit containing a single molecule has a = 4.4 Å. Cubic high temperature forms of $RbNO_3$, $CsNO_3$, and $TINO_3$ are iosmorphous with this AN(I). Their unit cubes have the lengths:

$RbNO_3$ 4.371 Å at 210° C.
$CsNO_3$ 4.490 Å at 170° C.
$TINO_3$ 4.313 Å at 170° C.

The second form, called Phase II, stable between 125° and 84° C., is identical to the above except that the $NO_3$ groups no longer rotate freely; AN(II) is tetragonal with unit cells of a = 5.75 and c = 5.0. Angstroms form (IV) like CsCl stable between −18° to 32° C. The orthorhombic unit cells are: a = 5.75, b = 5.45 and c = 4.96 Angstroms. The third modification of AN (Phase III) is stable between 84° and 32° C. and has a structure like NiAs or $KNO_3$ (orthorhombic). Its tetramolecular cells have lengths a = 7.06, b = 7.66, and c = 5.80 angstroms. Further refinement of its crystal structure has been reported from neutron diffraction work of AN and the neutron diffraction of AN-KN. Different approaches to phase stabilization of AN are:
(a) Diffusion of solids to AN lattice.
(b) Formation of Solid Solution.
(c) Reduction of N-H . . . O Hydrogen bonding.

E. FORMATION OF A TRUE SOLID SOLUTION AND A EUTECTIC

If host cations have its same (±15%) cationic radii, displacement of a $NH_4$ cation is favored. Replacement of compounds with a common anion and a cation of the same size would result in a favorable solid state reaction. Ionic radii of some anions and cations close to $NH_4$ and $NO_3$ are tabulated in Table IV.

TABLE IV

| IONIC RADII OF SOME CATIONS AND ANIONS | | | |
|---|---|---|---|
| CATIONS | | ANIONS | |
| NH4 | | NO3 | |
| 1.48 | | 1.83 | |
| K+ | 1.33 | S | 1.32 |
| Rb+ | 1.48 | Se | 1.91 |
| Tl+ | 1.50 | H | 1.54 |
| Hg+ | 1.27 | F | 1.33 |
| In+++ | 1.32 | Cl | 1.31 |
| Ba+ | 1.43 | Br | 1.96 |
| Cd++ | 1.03 | | |
| Cs+ | 1.67 | | |

Granting good solubility in AN, some or all of them would cause true displacement of the cation or anion. A classical example of this type is potassium nitrate (KN). It is well known since 1946 that AN-KN does result in "true phase stabilization". Later work confirms this. 10–15% by weight KN in 85–90% by weight AN added in the melt phase results in AN-KN with a crystal structure identical to AN(III), and the material maintains this crystal structure from below 0° C. to 80° C. The neutron diffraction studies point to N-H . . . O hydrogen bonding as a cause for disorder in crystal type. By replacing an ammonium by K ion, the extent of hydrogen bonding in the crystal is reduced. It is possible that replacing N-H . . . O hydrogen bonding would result in better thermal stability.

Thus, there exists several compounds of orthorhombic lattice type which have been used together with AN in order to allow displacement of some $NH_4$ ions in an AN lattice. This has resulted in at least a delay of phase transition. The fertilizer industry uses a few of these additives with AN solution, and upon prilling, the guest compounds stay at the surface of the host ammonium nitrate. Tables I and II list several compounds of lattice type like AN which may be used to impart thermal stability to AN via solid phase interactions. Use of some of these species is being reported in the literature currently and others will follow.

TABLE I

| LATTICE CONSTANTS OF SOME ORTHORHOMBIC AND MONOCLINIC SOLIDS OF TYPE M(n) (RX$_3$)p | | | | |
|---|---|---|---|---|
| | a | b | c | LATTICE TYPE |
| AN(III) | 7.677 | 5.821 | 7.139 | ORTHORHOMBIC |
| KNO$_3$ | | | | |
| KClO$_3$ | 4.647 | 5.585 | 4.365 | MONOCLINIC, ClO$_3$ TRIG. PYR. |
| H$_3$BO$_3$ | 7.04 | 7.04 | 6.56 | TRICLINIC |
| K$_2$CuCl$_3$ | 12. | 12.55 | 4.2 | |
| Cs$_2$AgCl$_3$ | 13.19 | 13.74 | 4.57 | |
| Cs$_2$AgI$_3$ | 14.39 | 15.16 | 5.02 | |
| Fe$_2$CuS$_3$ | 6.46 | 11.17 | 6.23 | ORTHORHOMBIC |
| H$_2$SeO$_2$ | 9.15 | 6.00 | 5.05 | ORTHORHOMBIC |
| MgBO$_3$ | 5.398 | 8.416 | 4.496 | ORTHORHOMBIC |
| Co$_3$(BO$_3$)$_2$ | 5.462 | 8.436 | 4.529 | ORTHORHOMBIC |
| K$_2$AgI$_3$ | 19.52 | 9.98 | 4.74 | ORTHORHOMBIC |
| Cu$_2$CsCl$_3$ | 9.49 | 11.88 | 5.610 | ORTHORHOMBIC |
| Ag$_2$CsI$_3$ | 11.08 | 13.74 | 6.23 | ORTHORHOMBIC |
| (NH$_4$)$_2$CuCl$_3$ | 14.71 | 22.07 | 4.08 | ORTHORHOMBIC |
| KHCO$_3$ | 15.176 | 5.630 | 3.703 | ORTHORHOMBIC |
| (NH$_4$)P$_4$O$_{12}$ | 10.42 | 10.82 | 12.78 | ORTHORHOMBIC |
| HIO$_3$ | 5.538 | 5.888 | 7.733 | ORTHORHOMBIC |
| LiSBO$_3$ | 4.813 | 8.491 | 5.183 | ORTHORHOMBIC |
| BaNiO$_3$ | 5.58 | 4.832 | | ORTHORHOMBIC |
| Li$_2$SnO$_3$ | 5.29 | 9.19 | 29.61 | MONOCLINIC |
| Na$_2$SnO$_3$ | 5.5 | 9.53 | 32.51 | MONOCLINIC |
| Na$_2$ZrO$_3$ | 5.6 | 9.7 | 32.75 | MONOCLINIC |
| BETA—Na$_2$PbO$_3$ | 5.68 | 9.84 | 32.90 | |
| NH$_4$HCO$_3$ | 7.30 | 10.81 | 8.78 | ORTHORHOMBIC |
| NH$_4$NO$_3$.2HNO$_3$ | 6.57 | 12.64 | 4.56 | MONOCLINIC |

TABLE I-continued

| LATTICE CONSTANTS OF SOME ORTHORHOMBIC AND MONOCLINIC SOLIDS OF TYPE M(n) (RX$_3$)p | | | | |
|---|---|---|---|---|
| | a | b | c | LATTICE TYPE |
| Na$_2$Ca$_2$(CO$_3$) | 34.99 | 10.99 | 7.11 | ORTHORHOMBIC |

TABLE II

| CRYSTALS WITH ORTHORHOMBIC KNO$_3$ ARRANGEMENT | | | | |
|---|---|---|---|---|
| | a | b | c | (ANGSTROMS) |
| BaCO$_3$ | 8.835 | 6.549 | 5.256 | |
| CaCO$_3$ | 7.94 | 5.72 | 4.94 | ARAGONITE |
| CaBa(CO$_3$)$_2$ | 8.77 | 6.11 | 4.99 | ALSTONITE |
| CaPb(CO$_3$)$_2$ | 8.016 | 5.79 | 4.97 | TARNOWITZITE |
| KNO$_3$ | 9.17 | 6.45 | 5.43 | |
| LaBO$_3$ | 8.22 | 5.83 | 5.10 | |
| PbCO$_3$ | 8.468 | 6.146 | 5.166 | |
| SrCO$_3$ | 8.42 | 6.10 | 5.13 | |

However, upon grinding the prills, the effect is lost. As a visible sign, prills show no caking for many months. The guest compounds may have higher hardness compared to AN. They prevent the growth for some time.

Recent Russian work refers to an organic polyester coating of AN which results in better thermal properties, but this phenomena is well known to U.S.A. propellant makers in that cellulose acetate-AN propellants show significantly improved thermal properties, perhaps because of the rigid nature of the binder.

F. DEVELOPMENT WORK

We examined several materials by DSC and TMA (Differential Scanning Calorimetry and Thermomechanical Analysis).

Commercial AN and deuterated AN (Table VII) and Mississippi Chemical AN containing 0.3% additive $K_2SO_4$, $(NH_4)_2PO_4$, and $B(OH)_3$ (Table VI) all show both widely varying thermal contraction and expansion coefficients depending on temperature as evidenced by TMA analysis. The TMA of Hercules phase stabilized AN containing 3.5% and 2.5% NI-complex are shown in Table VIII. Even on many hysteresis runs the crystals show only a linear expansion from −20° to 70° C., an insufficient range for rockets. The coefficient of expansion of all of the above materials may be found in Tables VI through VIII.

TABLE VI

| LINEAR EXPANSION COEFFICIENT OF MISSISSIPPI PSAN | | |
|---|---|---|
| START LENGTH | 4.1308 | |
| TEMPERATURE | EXPANSION COEFFICIENT | ΔL |
| °C. | x10$^{-6}$/°K. | μm |
| −55.0 | 11.3 | .00000 |
| −50.0 | 15.8 | .18000 |
| −45.0 | 22.2 | .64000 |
| −40.0 | 15.4 | 1.2800 |
| −35.0 | 10.8 | 1.5200 |
| −30.0 | .4 | 1.6000 |
| −25.0 | −10.8 | 1.6400 |
| −20.0 | −22.6 | 1.2000 |
| −15.0 | −33.5 | .60000 |
| −10.0 | −44.9 | −.24000 |
| −5.0 | −59.9 | −1.2600 |
| 0000.0 | −83.0 | −2.7400 |
| 5.0 | −119.8 | −4.6800 |
| 10.0 | −179.7 | −7.5800 |
| 15.0 | −240.1 | −12.080 |
| 20.0 | −259.6 | −17.600 |

TABLE VI-continued

LINEAR EXPANSION COEFFICIENT OF MISSISSIPPI PSAN

START LENGTH 4.1308

| °C. | TEMPERATURE EXPANSION COEFFICIENT $\times 10^{-6}/°K.$ | $\Delta L$ $\mu m$ |
|---|---|---|
| 25.0 | −235.5 | −22.880 |
| 30.0 | −212.8 | −27.380 |
| 35.0 | −204.7 | −31.720 |
| 40.0 | −182.0 | −35.060 |
| 45.0 | −140.7 | −39.280 |
| 50.0 | −98.9 | −41.660 |
| 55.0 | −72.6 | −43.300 |
| 60.0 | −55.8 | −44.600 |
| 65.0 | −28.1 | −45.660 |
| 70.0 | 61.2 | −45.680 |
| 75.0 | 107.1 | −43.140 |
| 80.0 | 93.9 | −41.540 |

TABLE VII

LINEAR EXPANSION COEFFICIENT OF $ND_4NO_3$

START LENGTH 2.5080

| °C. | TEMPERATURE EXPANSION COEFFICIENT $\times 10^{-6}/°K.$ | $\Delta L$ $\mu m$ |
|---|---|---|
| −100.0 | 17.1 | .00000 |
| −95.0 | 23.1 | .14000 |
| −90.0 | 26.1 | .50000 |
| −85.0 | 25.4 | .96000 |
| −80.0 | 29.1 | 1.3200 |
| −75.0 | 32.1 | 1.6800 |
| −70.0 | 32.1 | 2.0800 |
| −65.0 | 34.3 | 2.5200 |
| −60.0 | 38.1 | 2.9600 |
| −55.0 | 35.1 | 3.4000 |
| −50.0 | 32.1 | 3.8400 |
| −45.0 | 28.4 | 4.2000 |
| −40.0 | 24.6 | 4.5400 |
| −35.0 | 23.1 | 4.8600 |
| −30.0 | 20.1 | 5.1600 |
| −25.0 | 17.9 | 5.3600 |
| −20.0 | 8.2 | 5.5800 |
| −15.0 | −24.6 | 5.6200 |
| −10.0 | −188.4 | 5.0400 |
| −5.0 | −618.2 | 1.1000 |
| 0000.0 | −1091.5 | −10.380 |
| 5.0 | −1161.8 | −26.440 |
| 10.0 | −771.5 | −39.880 |
| 15.0 | −328.9 | −45.980 |
| 20.0 | −106.1 | −47.860 |
| 25.0 | −37.3 | −48.520 |
| 30.0 | 21.6 | −48.780 |
| 35.0 | 268.4 | −48.180 |
| 40.0 | 657.1 | −42.340 |
| 45.0 | 787.2 | −31.620 |
| 50.0 | 469.5 | −22.240 |
| 55.0 | 78.5 | −19.600 |
| 60.0 | −96.4 | −20.520 |
| 65.0 | −142.0 | −22.100 |
| 70.0 | −185.4 | −24.140 |
| 75.0 | −229.5 | −26.660 |
| 80.0 | −278.1 | −29.880 |
| 85.0 | −343.9 | −33.740 |
| 90.0 | −414.1 | −38.440 |
| 95.0 | −478.4 | −44.060 |
| 100.0 | −500.9 | −50.420 |
| 105.0 | −465.0 | −56.720 |
| 110.0 | −352.1 | −62.200 |
| 115.0 | −119.6 | −65.640 |
| 120.0 | 217.5 | −65.340 |
| 125.0 | 373.8 | −60.000 |
| 130.0 | 328.9 | −56.400 |

TABLE VIII

LINEAR EXPANSION COEFFICIENT OF HERCULES PHASE STABILIZED AN

START LENGTH 4.0063

| °C. | TEMPERATURE EXPANSION COEFFICIENT $\times 10^{-6}/°K.$ | $\Delta L$ $\mu m$ |
|---|---|---|
| −55.0 | 35.1 | .00000 |
| −50.0 | 51.0 | .42000 |
| −45.0 | 75.3 | 1.8600 |
| −40.0 | 90.3 | 4.1200 |
| −35.0 | 94.5 | 5.9000 |
| −30.0 | 100.6 | 7.9400 |
| −25.0 | 104.8 | 9.9800 |
| −20.0 | 109.5 | 12.160 |
| −15.0 | 114.2 | 14.420 |
| −10.0 | 118.4 | 16.780 |
| −5.0 | 124.5 | 19.180 |
| 0000.0 | 129.1 | 21.680 |
| 5.0 | 133.3 | 24.280 |
| 10.0 | 139.4 | 27.080 |
| 15.0 | 146.9 | 29.880 |
| 20.0 | 154.4 | 32.840 |
| 25.0 | 166.1 | 36.120 |
| 30.0 | 178.3 | 39.520 |
| 35.0 | 190.5 | 43.180 |
| 40.0 | 201.7 | 47.060 |
| 45.0 | 211.5 | 51.320 |
| 50.0 | 215.7 | 55.540 |
| 55.0 | 220.9 | 59.900 |
| 60.0 | 242.9 | 64.400 |
| 65.0 | 319.2 | 69.740 |
| 70.0 | 503.1 | 77.100 |
| 75.0 | 589.7 | 89.580 |
| 80.0 | 560.2 | 100.12 |

It has been suggested that 5-aminotetrazole (5-AT) may cause phase stabilization of AN. An examination of crystal structure revealed that at least the mononitrate is orthorhombic (Table III).

TABLE III

LATTICE CONSTANTS OF SOME TETRAZOLES

| | a | b | c | (ANGSTROMS |
|---|---|---|---|---|
| 5-AT.H20 | 6.39 | 7.28 | 9.80 | MONOCLINIC |
| 5-ATGUANIDINATE | 11.94 | 7.05 | 7.05 | ORTHORHOMBIC |
| ME.AM.TETRAZOLE | 9.7 | 13.70 | 7.09 | MONOCLINIC |
| NITRO.AM.TETRAZOLE | 9.4 | 5.56 | 9.36 | MONOCLINIC |
| DIME.AM.TETRAZOLE | 13.78 | 9.90 | 7.88 | ORTHORHOMIC |

Our experiments showed that AN and 5-AT formed solid solutions. Although there was diminution of the energy of phase transitions, AN always went through the expansion and contraction phases. Thus, contrary to the suggestions, AN-5AT does not inhibit crystalline growth.

The phase stabilizer we recently discovered, KF, results unexpectedly in what we considered to be true phase stabilization when it is added in 1-2% by weight to AN. The results of a DSC and TMA of this material are presented in Table IX. "OCGI-1" and "OCGI" as used herein means Potassium Fluoride.

TABLE IX

LINEAR EXPANSION COEFFICIENT OF NH4NO3 + 2% OCGI-1

START LENGTH 4.1234

| °C. | TEMPERATURE EXPANSION COEFFICIENT $\times 10^{-6}/°K$. | ΔL μm |
|---|---|---|
| −55.0 | 20.9 | .00000 |
| −50.0 | 30.4 | .28000 |
| −45.0 | 44.1 | 1.1600 |
| −40.0 | 50.0 | 2.5200 |
| −35.0 | 53.2 | 3.6200 |
| −30.0 | 54.5 | 4.6800 |
| −25.0 | 57.7 | 5.3600 |
| −20.0 | 57.7 | 7.0800 |
| −15.0 | 58.6 | 8.3000 |
| −10.0 | 58.6 | 9.5600 |
| −5.0 | 60.9 | 10.820 |
| 0000.0 | 62.2 | 12.040 |
| 5.0 | 62.2 | 13.380 |
| 10.0 | 62.2 | 14.660 |
| 15.0 | 63.6 | 15.940 |
| 20.0 | 64.1 | 17.320 |
| 25.0 | 66.8 | 18.660 |
| 30.0 | 69.5 | 20.040 |
| 35.0 | 70.9 | 21.460 |
| 40.0 | 72.7 | 22.900 |
| 45.0 | 74.1 | 24.420 |
| 50.0 | 75.4 | 25.980 |
| 55.0 | 78.6 | 27.520 |
| 60.0 | 80.9 | 29.200 |
| 65.0 | 86.4 | 30.900 |
| 70.0 | 87.7 | 32.680 |
| 75.0 | 92.3 | 34.600 |
| 80.0 | 90.9 | 36.500 |

The size of the pellet during 10 cycles between −50° and 80° C. is presented in Table V. Note that the Linear expansion is below 1%. This phase stabilized AN could be used in gas generator and explosive formulations.

TABLE V

THERMAL EXPANSION DATA AN WITH 2% BY WEIGHT OF OCGI-1 ADDITIVE 10 CYCLES −55 to 80° C.

| RUN # | LENGTH (MM) | EXPANSION COEFFICIENT $\times 10^{-6}/°K$. | Δl μm |
|---|---|---|---|
| 1-G | 4.1424 | 64.7 | 34.78 |
| 2-G | 4.1276 | 75.0 | 36.74 |
| 3-G | 4.1281 | 66.7 | 36.52 |
| 4-G | 4.1355 | 70.7 | 37.12 |
| 5-G | 4.1345 | 68.0 | 34.42 |
| 6-G | 4.1192 | 61.9 | 35.44 |
| 7-G | 4.1193 | 66.4 | 35.86 |
| 8-G | 4.1206 | 78.7 | 37.24 |
| 9-G | 4.1232 | 70.0 | 36.50 |

EXAMPLE 1

To a molten 25 gm. of NH4NO3, 0.5 gm. of anhyhous KF were added and mixed by stirring and the mixture was cooled in a dry environment to ambient temperature.

A first 2 mg. portion of the cooled mixture was then heated at 5° C./min. from −100° C. to +150° C. and then cooled at 5° C./min. from +150° C. to −100° C. while measuring the endothermic energy transitions compared with the phase changes by using a differential scanning calorimeter. The normal endotherms indicative of phase transitions at −18° C. and 32° to 46° C. were absent during both heating and cooling.

A second 2.4 mm thick cylindrical pellet of the cooled mixture was then heated at 5° C./min. from −55° C. to +180° C. and then cooled at 5° C./min. from 80° C. to −50° C. while measuring the thermal expansion/contraction and the linear expansion coefficient by using a thermo-mechanical analyzer. On heating the normal contraction at −18° C. and expansion at 32° to 46° C. did not occur and on cooling the normal contraction at 46° to 32° C. and expansion at −18° C. did not occur. The expansion (on heating) and contraction (on cooling) were both linear over this −55° 1 C. to +80° C. temperature range.

EXAMPLE 2

The tests of Example 1 were repeated first using 0.5% and then again with 1% by weight KF in the AN.

The 1.0% KF sample still showed no endotherms and had linear expansion over the −55° C. to 80° C. temperature range.

The 0.5% KF sample showed reduced endotherms and showed non-linear expansion and contraction at −18° C. and +32° to 46° C.

EXAMPLE 3

The NH4NO3 with 2% by weight of KF additive is mixed in a polyurethane binder in the ratio of 80% modified NH4NO3 and 20% binder.

The thermo-mechanical analyzer studies show linear expansion and contraction over the −55° C. to +80° C. temperature range.

EXAMPLE 4

The tests of Example 3 are repeated using the following binders instead of polyurethane:
(a) polybutadiene acrylic acid in hexane solvent after removal of solvent.
(b) cellulose acetate
(c) glycedyl axide polymer
(d) polyethylene glycol
(e) polycaprolactam binders
(f) polyisoprene binder The thermo-mechanical analysis in each case still showed linear expansion and contraction over a −55° C. to +80° C. temperature range.

What is claimed is:

1. Ammonium nitrate-potassium fluoride mixed crystals wherein the weight per cent of potassium fluoride in the mixed crystal is within the range of from about 0.5% to about 2% by weight.

2. The Ammonium Nitrate of claim 1 in which the weight percent of Potassium Fluoride in the Ammonium Nitrate is within range of from about 1 percent to about 2 percent.

3. A method of stabilizing ammonium nitrate which comprises the steps of:
(a) heating the ammonium nitrate to the molten state,
(b) adding a stabilizing amount of KF to the ammonium nitrate, and
(c) cooling the ammonium nitrate to below the melting point.

* * * * *